United States Patent
Shirai et al.

(10) Patent No.: US 6,785,639 B2
(45) Date of Patent: Aug. 31, 2004

(54) SIGNAL PROCESSING APPARATUS

(75) Inventors: Katsuyoshi Shirai, Anjo (JP);
Toshiyuki Matsuo, Takahama (JP);
Kenichi Taguchi, Toyota (JP);
Satohiko Nakano, Chiryu (JP);
Kazuhiro Kamiya, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 85 days.

(21) Appl. No.: 10/254,843

(22) Filed: Sep. 26, 2002

(65) Prior Publication Data

US 2003/0110008 A1 Jun. 12, 2003

(30) Foreign Application Priority Data

Sep. 26, 2001 (JP) .................................. 2001-295147

(51) Int. Cl.[7] .................................................. H03G 3/20
(52) U.S. Cl. ...................................... 702/189; 327/60
(58) Field of Search ............................. 702/189, 126, 702/74, 66, 188, 191, 193, 194, 199; 327/3, 24, 40, 58, 60, 63

(56) References Cited

U.S. PATENT DOCUMENTS 5,493,219 A * 2/1996 Makino et al. ........ 324/207.25
5,574,714 A * 11/1996 Masashi et al. .......... 369/124.1
6,173,018 B1 * 1/2001 Kuroki ....................... 375/317
6,271,690 B1 * 8/2001 Hirano et al. ................. 327/75

FOREIGN PATENT DOCUMENTS

JP 6-300584 A 10/1994
JP 10-73454 A 3/1998

* cited by examiner

Primary Examiner—Marc S. Hoff
Assistant Examiner—Edward Raymond
(74) Attorney, Agent, or Firm—Burns, Doane, Swecker & Mathis, L.L.P.

(57) ABSTRACT

A threshold value at a side of a bottom value of a sensor signal is renewed by a value calculated by multiplying a minimum value of a deviation between the bottom value and a reference value for the predetermined period of time by a ratio when the minimum value of the deviation is equal to or smaller than the threshold value. A threshold value at a side of a peak value thereof is also renewed by a value calculated by multiplying a minimum vale of a deviation between the peak value and the reference value from the predetermined period of time by a ratio when the minimum value of the deviation is equal to or smaller than the threshold value.

10 Claims, 9 Drawing Sheets

SIGNAL PROCESSING APPARATUS

CROSS REFERENCE TO RELATED APPLICATIONS

This application is based on and claims priority under 35 U.S.C. § 119 with respect to a Japanese Patent Applications 2001-295147, filed on Sep. 26, 2001, the entire content of which is incorporated herein by reference.

FIELD OF THE INVENTION

This invention generally relates to a signal processing apparatus for binary processing a sensor signal. More particularly, this invention pertains to a signal processing apparatus for setting a threshold value with reference to a peak value of a sensor signal and a bottom value thereof and for outputting a binary signal based upon the threshold value.

BACKGROUND OF THE INVENTION

One of known sensor signal processing apparatuses is disclosed in a Japanese Patent Laid-Open Publication No.6 (1994)-300584. The sensor signal processing apparatus functions for holding a peak value of an output signal from a sensor and for holding a bottom value thereof. A threshold value, which is set based upon the aforementioned peak value and the aforementioned bottom value, is compared with the output signal from the sensor. The sensor signal processing apparatus therefore outputs a binary signal in accordance with the size relationship between the threshold value and the output signal from the sensor.

Further, an apparatus, in which the threshold value is set based upon the peak value of the output signal from the sensor and the bottom value thereof, is disclosed in another Japanese Patent Laid-Open Publication Hei.10 (1998)-73454. According to the apparatus disclosed in this Japanese Patent Laid-Open Publication, a voltage that is proportionally related to a magnetic field is employed as a sensor signal. A threshold value is set by multiplying a peak value of the voltage by a fixed percentage. The other threshold value is also set by multiplying a bottom value of the voltage by a fixed percentage. Therefore, a binary signal of the sensor signal can be generated based upon the two threshold values.

More specifically, according to the apparatus disclosed in this Japanese Patent Laid-Open Publication, an upper threshold value is set by multiplying the peak value of the voltage (i.e. the sensor signal) by a fixed percentage and a lower threshold value is also set by multiplying the bottom value of the voltage (i.e. the sensor signal) by a fixed percentage. Therefore, a binary processing of the sensor signal can be performed based upon the upper and lower threshold values.

However, a following problem to be overcome may occur according to the above-described binary processing method of the sensor signal. As illustrated in FIG. 9, the sensor signal may be fluctuated within a range between the upper and lower threshold values for a predetermined period of time after period of times T1 and T2 due to a position relationship between the rotated rotor and the sensor or an inaccuracy for manufacturing the teeth or slits provided with the rotor. In this case, a wave shape of the sensor signal may not be able to be generated while the sensor signal has been fluctuated within the range between the upper and lower threshold values so that a pulse failure may occur. It may result in that an accurate binary signal may not be able to be outputted based upon the sensor signal fluctuating within the range between the upper and lower threshold values.

Accordingly, it is still susceptible of certain improvements with respect to providing an improved signal processing apparatus for outputting an accurate binary signal without causing the pulse failure.

SUMMARY OF THE INVENTION

A signal processing apparatus in the present invention comprises a bottom value memorizing means for memorizing a bottom value of a sensor signal, a peak value memorizing means for memorizing a peak value of a sensor signal, a reference value calculating means for calculating a reference value based upon the bottom value and the peak value, a deviation calculating means for calculating a first deviation between the reference value and the bottom value and a second deviation between the reference value and the peak value, a threshold value setting means for calculating a first average value of the first deviation for a predetermined period of time and a second average value of the second deviation for the predetermined period of time, and for setting a first threshold value based upon the first average value multiplied by a first ratio and a second threshold value based upon the second average value multiplied by the first ratio, and an outputting means for outputting a binary signal by comparing the sensor signal with the first threshold value and by comparing the sensor signal with the second threshold value.

The first threshold value is renewed by a first value calculated by multiplying a minimum value of the first deviation for the predetermined period of time by a second ratio when the minimum value of the first deviation is equal to or smaller than the first threshold value and the second threshold value is renewed by a second value calculated by multiplying a minimum value of the second deviation for the predetermined period of time by the second ratio when the minimum value of the second deviation is equal to or smaller than the second threshold value, and the outputting means outputs the binary signal based upon the renewed first threshold value when the minimum value of the first deviation is equal to or smaller than the first threshold value and the outputting means outputs the binary signal based upon the renewed second threshold value when the minimum value of the second deviation is equal to or smaller than the second threshold value.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

Figure 1:
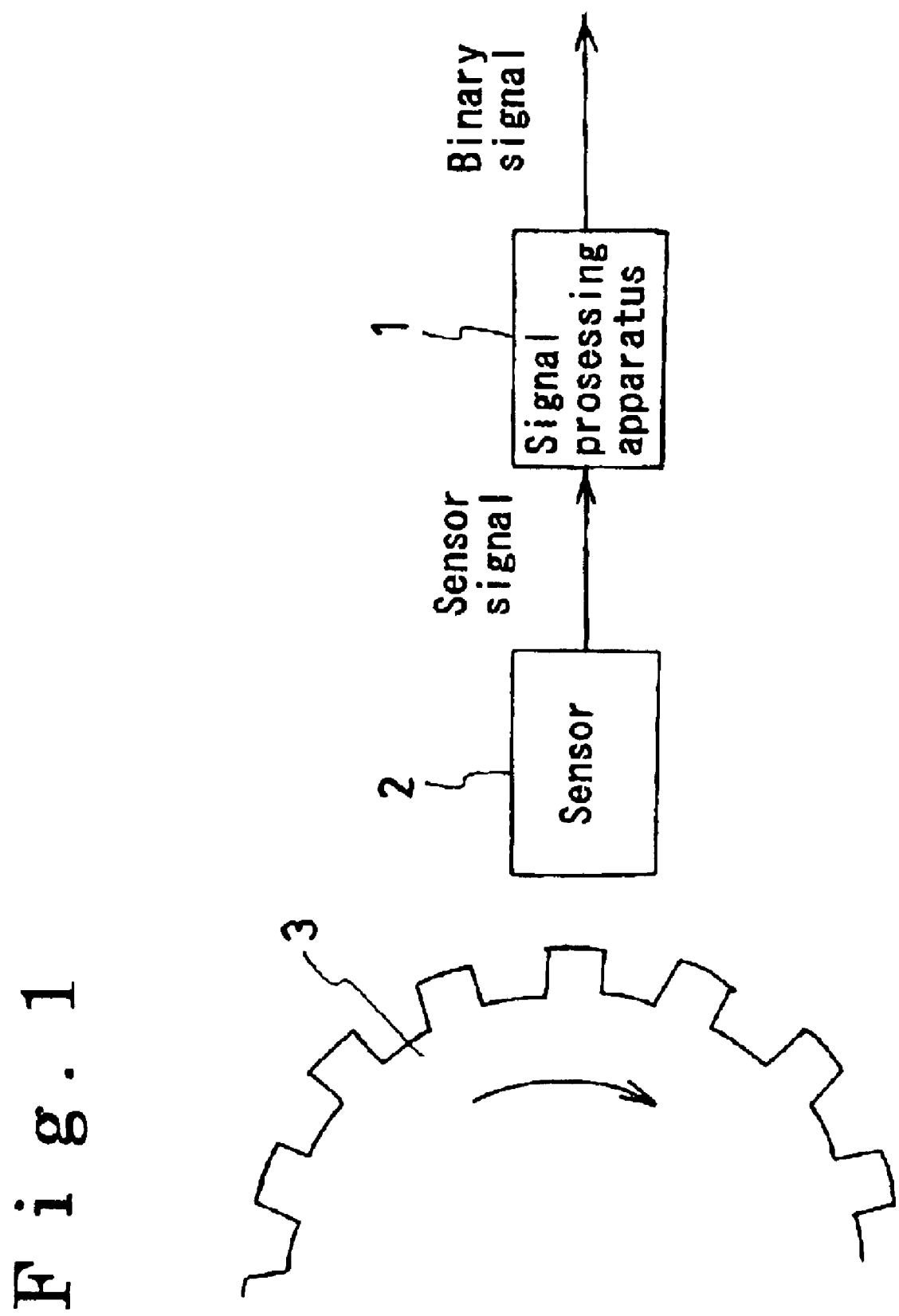
FIG. 1 is a schematic block view illustrating a mechanism provided with a signal processing apparatus according to the present invention.

Referring to FIG. 1, a rotary rotor 3 is integrally provided with plural teeth at an outer periphery thereof. A sensor 2 is implanted with a magnet (not shown) and a coil (not shown) therein and is arranged in proximity to the teeth of the rotor 3. As being arranged above, a magnetic flux emanating from the magnet toward the rotor 3 is changed in accordance with a position of the teeth of the rotor 3 when the rotor 3 is rotated. An output of a magnetic detecting element is hence changed so as to generate a sensor signal proportionally related to a rotational speed of the rotor 3.

According to embodiments of the present invention, a signal processing apparatus 1 sets a threshold value based upon the condition of the sensor signal generated as described above. A binary signal is outputted from the signal processing apparatus 1 based upon the threshold value. The signal condition of the binary signal can be switched between a high electric potential (Hi) and a low electric potential (Lo). The following explanation according to the embodiments of the present invention is applicable for the signal processing apparatus 1, in which a binary processing is performed by a soft ware based upon the senor signal inputted into the signal processing apparatus 1. However, the following explanation can be also applicable for a signal processing apparatus, in which the binary processing is performed by a hard ware based upon the sensor signal inputted into the signal processing apparatus 1. Further, as described above, the rotor 3 is integrally provided with the plural teeth. However, the rotor 3 can be provided with plural slits as substitute for the plural teeth.

Figure 2:
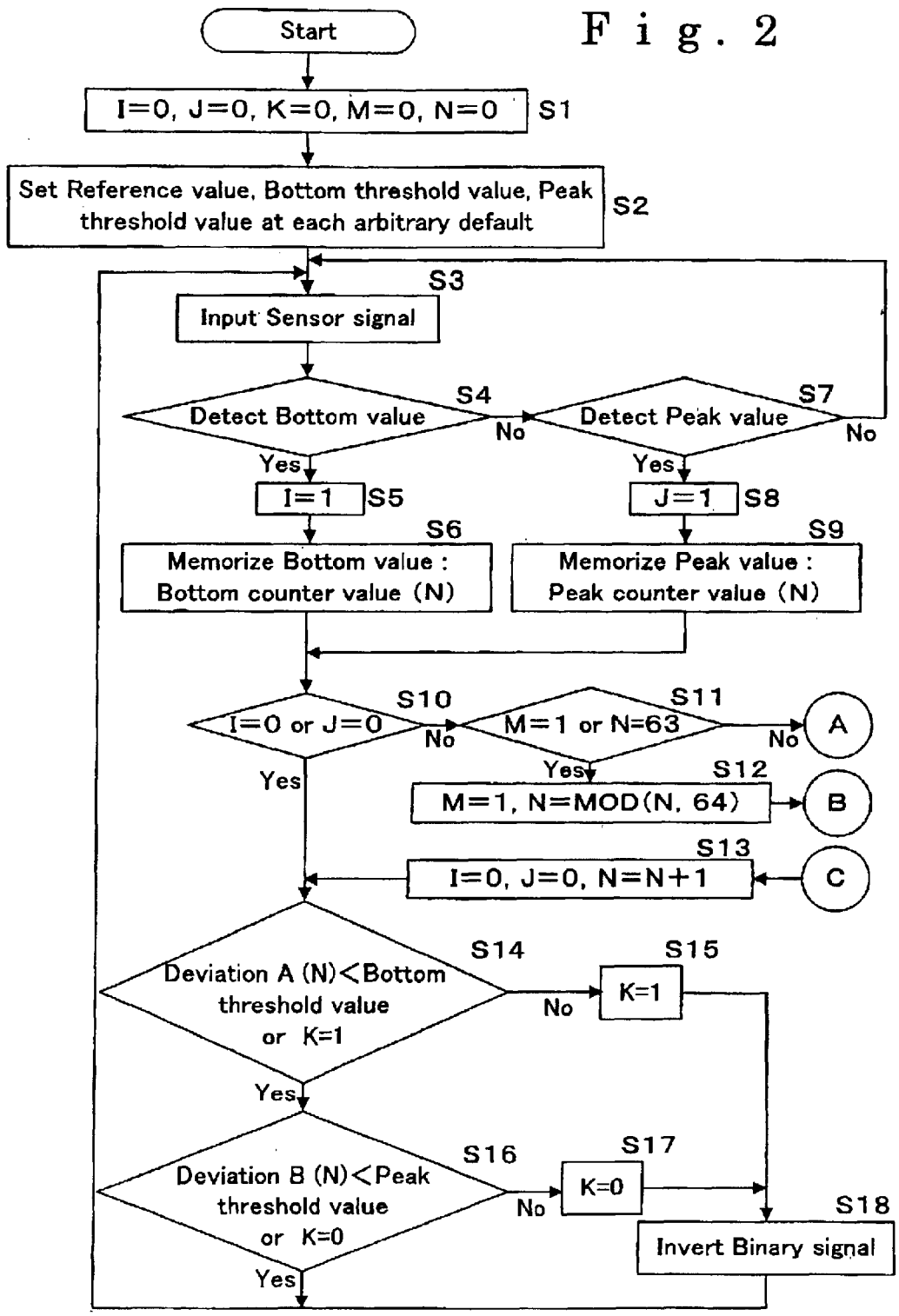
FIG. 2 is a flow chart illustrating a process performed by the signal processing apparatus shown in FIG. 1 according to the first embodiment of the present invention.

Referring to FIG. 2, the program first proceeds to step S1, wherein the signal processing apparatus 1 according to a first embodiment of the present invention initializes a bottom value detection flag I denoting a detection of a bottom value of the sensor signal, a peak value detection flag J denoting a detection of a peak value thereof, and condition flags K and M denoting predetermined conditions of the sensor signal to be a value of 0. The signal processing apparatus 1 further sets a rotational number counter value N at a value of 0. The program then proceeds to step S2 for setting a reference value, a bottom threshold value, and a peak threshold value at arbitrary defaults, respectively. At step S3, the sensor signal is inputted into a central processing unit (CPU, not shown) of the signal processing apparatus 1. The program proceeds to step S4 for detecting the bottom value of the sensor signal. When the bottom value is detected the program then proceeds to step S5 for setting the bottom value detection flag I at a value of 1. On the other hand, when the bottom value is not detected at step S4, the program proceeds to step S7 for detecting the peak value of the sensor signal. When the peak value is detected at step S7, the program then proceeds to step S8 for setting the peak value detection flag J at a value of 1. On the other hand, when both the bottom value and the peak value are not detected at steps S4 and S7, the program returns to step S3.

At steps S6 and S9, the bottom value and the peak value are memorized at predetermined memories accommodated in the CPU, respectively. More particularly, the bottom value is memorized at a bottom counter value (N) (i.e. a bottom value memorizing means) and the peak value is memorized at a peak counter value (N) (i.e. a peak value memorizing means). According to the first embodiment of the present invention, the rotational number counter value N can be set from 0 through 63 so that each bottom value and peak value can be memorized the number of 64 times. That is, the sensor signal condition can be memorized at sixty-four sequent bottom counter values (N) for the bottom value and at sixty-four sequent peak counter values (N) for the peak value. Each bottom and peak counter value (N) is set based upon the counter value N as a pointer position. A method for sequentially memorizing the bottom value and the peak value from the sensor signal has been well known already. The memorizing method has been disclosed, for example in a Japanese Patent Laid-Open Publication Hei. 6(1994)-300584. Therefore, a detailed description about the memorizing method is omitted for simplifying the entire description. Once both the bottom value and the peak value are memorized at steps S6 and S9, respectively, the program proceeds to step S10. At step S10, the CPU judges whether or not either the bottom value detection flag I or the peak value detection flag J has been initialized to be the value of zero. When either the bottom value or the peak value has been memorized at step S6 or step S9, the program proceeds to step S11. At step S11, the CPU judges whether or not the condition flag M has been set at a value of 1 or judges whether or not the counter value N of the bottom value and the peak value has been incremented up to a value of 63. Alternatively, when both the bottom value and the peak value have been memorized at steps S6 and S9, the program can proceed to step S11. In this case, the same effect can be proved as the first embodiment of the present invention.

Next, the process described below is performed either when the condition flag M has not been set at the value of 1 or when the counter value N has not been incremented up to the value of 63 at step S11.

Figure 3:
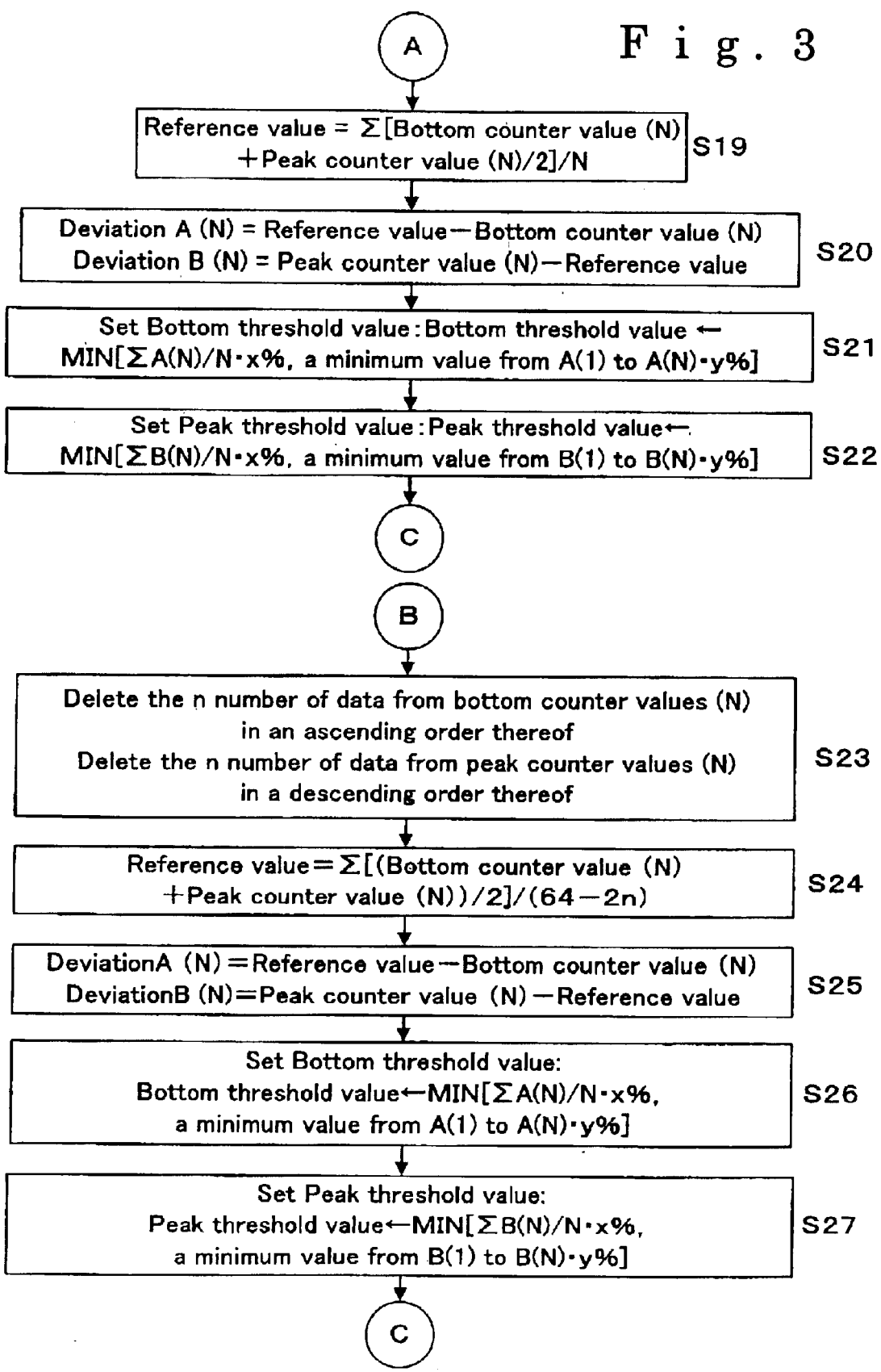
FIG. 3 is a flow chart continued from the flow chart shown in FIG. 2 according to the first embodiment.
Figure 4:
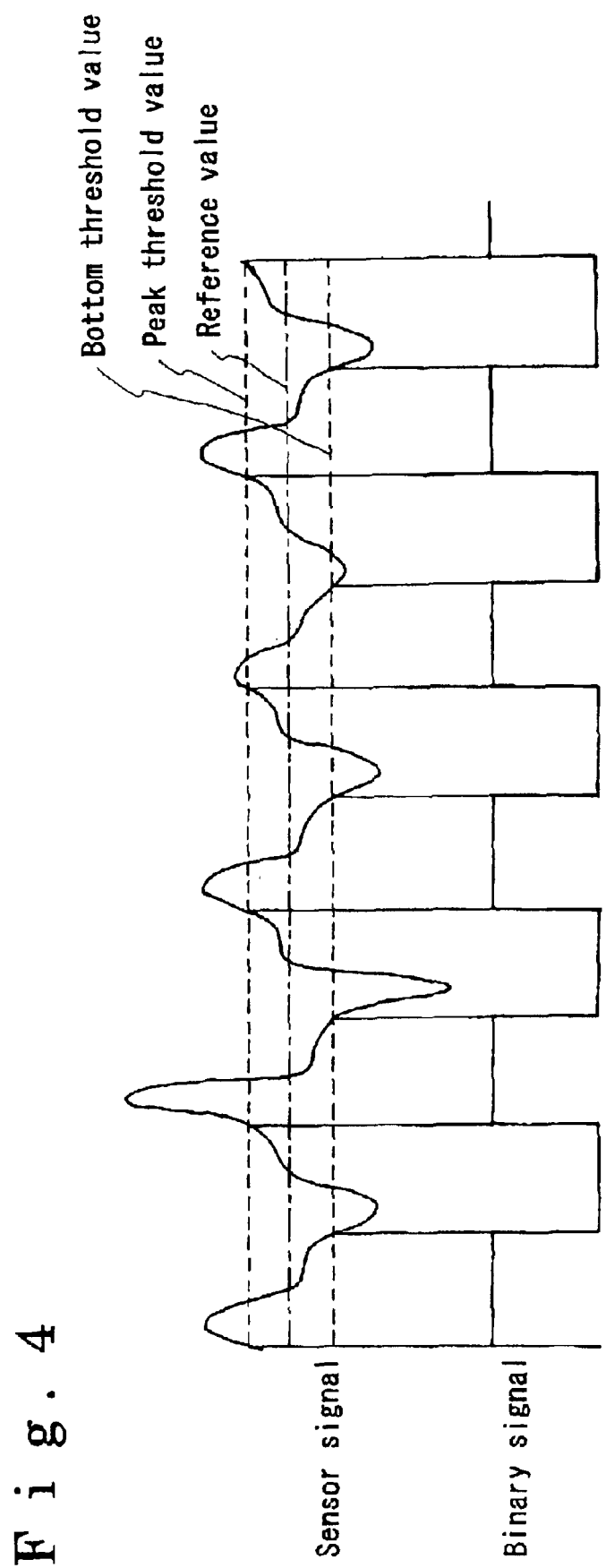
FIG. 4 illustrates a relationship between a wave shape of a sensor signal inputted into the signal processing apparatus and a wave shape of a binary signal outputted therefrom according to the first embodiment.

When the condition flag M has not been set at the value of 1 or when the counter value N has not been incremented up to the value of 63, the program proceeds to step S19 shown in FIG. 3. At step S19, a reference value is calculated in accordance with the following formula (i.e. a reference value calculating means):

Reference value=$\Sigma$[Bottom counter value $(N)$+Peak counter value $(N)/2$]$N$ The reference value is calculated by striking an average value of the bottom value and the peak value divided by the number of memorizing times. The program then proceeds to step S20 so as to calculate a deviation A(N) at the side of the bottom value and a deviation B(N) at the side of the peak value based upon the reference value in accordance with the following formula (i.e. a deviation calculating means):

Deviation $A(N)$=Reference value−Bottom counter value $(N)$,

Deviation $B(N)$=Peak counter value $(N)$−Reference value.

The program sequentially proceeds to steps S21 and S22, wherein a bottom threshold value and a peak threshold value are respectively set based upon the reference value calculated at step S19 and the deviations A(N), B(N) in accordance with the following formulas (a threshold value setting means):

Bottom threshold value=MIN[ΣA(N)/N·x %, a minimum value from A(1) to A(N)·y %], and Peak threshold value=MIN[ΣB(N)/N·x %, a minimum value from B(1) to B(N)·y %].

As described above, the CPU compares two values so as to set a smaller value thereof as the bottom threshold value. One of the two values is calculated by multiplying an average value of the deviations A(N) by a predetermined ratio x %. The other one of the two values is calculated by multiplying the minimum value from the deviation A(1) to the deviations A(N) by a predetermined ratio y %. It premises that the average value of the deviations A(N) corresponds to 100% and the reference value corresponds to 0% relative to the average value of the deviations A(N). In the same manner, the CPU compares two values so as to set a smaller value thereof as the peak threshold value. One of the two values is calculated by multiplying an average value of the deviations B(N) by the predetermined ratio x %. The other one of the two values is calculated by multiplying the minimum value from the deviation B(1) to the deviations B(N) by the predetermined ratio y %. It also premises that the average value of the deviations B(N) corresponds to 100% and the reference value corresponds to 0% relative to the average value of the deviations B(N). The predetermined ratios x % and y % are set for example at several tens percentages. Further, the value of x is always set to be smaller than a value of one hundred.

More specifically, according to the first embodiment of the present invention, the bottom threshold value and the peak threshold value are set at positions which are lower than the average value of the deviations A(N) by x % and lower than the average value of the deviations B(N) by x %, respectively. Therefore, the binary signal can be outputted based upon the bottom threshold value and the peak threshold value. However, there may be a case that the sensor signal is fluctuated at lower positions than the positions of the bottom and peak threshold values. In this case, the binary signal may not be outputted based upon the sensor signal fluctuated at the lower positions which are not included by the first conditional expressions (ΣA(N)/N·x % and ΣB(N)/N·x %). To overcome the problem, each bottom threshold value and peak threshold value is renewed by a value calculated in accordance with each second conditional expression (the minimum value from A(1) to A(N)·y % and the minimum value from B(1) to B(N)·y %). In this case, each bottom threshold value and peak threshold value can be set at lower positions than the minimum value of the deviations A(N) and the minimum value of the deviations B(N), respectively. Therefore, although the binary signal can not be outputted based upon the bottom and peak threshold values set only in accordance with the first conditional expressions, the wave shape of the fluctuating sensor signal can be detected based upon the bottom and peak threshold values in accordance with the second conditional expressions. Therefore, the binary signal can be outputted.

The program then proceeds to step S13 illustrated in FIG. 2, wherein the bottom value detection flag I and the peak value detection flag J are initialized to be zero, and the counter value N for denoting the number of detecting times of the bottom value and the peak value are set at (N+1). The program then proceeds to step S14 for judging whether or not the deviation A(N) is smaller than the bottom threshold value set at step S21 or for judging whether or not the flag K has been set at a value of 1. The flag K is set at the value of 1 when the deviation A(N) exceeds the bottom threshold value. When at least either one of the conditions at step S14 is satisfied, the program then proceeds to step S16. However, when at least either one of the conditions at step S14 is not satisfied, the program proceeds to step S15 so as to set the flag K at the value of 1. The program further proceeds to step S18 from step S15. At step S16, the CPU judges whether or not the deviation B(N) is smaller than the peak threshold value set at step S22 or judges whether or not the flag K has been set at the value of 0. When at least either one of the conditions at step S16 is satisfied, the program returns to step S3 so as to repeatedly perform the process from step S3. However, when at least either one of the conditions at step S16 are not satisfied, the program then proceeds to step S17 so as to set the flag K at the value of 0. The program further proceeds to step S18 from step S17. The binary signal with the high electric potential (Hi) is inverted to the binary signal with the low electric potential (Lo) at step S18. ON the other hand, the binary signal with the low (Lo) is inverted to the binary signal with the high electric potential (Hi) at step S18. The program then returns to step S3 and the process from step S3 is repeatedly performed.

Next, the process described below is performed when the counter value N has been incremented up to the value of 63 at step S11.

When the counter value N of the bottom value and the peak value at step S11 reach to the value of 63, the program proceeds to step S12. The condition flag M is set at the value 1 when the number of the detecting times of the peak value and the bottom value reaches to the value of 64. Therefore, at step S12, the condition flag M is set at the value of 1. The bottom value has been already memorized at the bottom counter value (N) the number of sixty four times and the peak value has been also already memorized at the peak counter value(N) the number of sixty four times. In this case, the counter value N at step S12 is calculated in accordance with the following formula:

$N=MOD(N,64)$

As described above, the counter value N is replaced by a surplus divided by the value of 64 so as to update the memorized condition in preparation for the process at step S23.

When the program proceeds to step S23, the bottom values which have been already memorized the number of sixty-four times are sorted in an order of scale and the number of n data are deleted in an ascending order of scale. In the same manner, the peak values which have been already memorized the number of sixty-four times are sorted in an order of scale and the n number of data are deleted in a descending order of scale. That is, the n number of data in the ascending order of scale of the bottom values and the n number of the data in the descending order of scale of the peak values are not employed for setting the bottom threshold value and the peak threshold value, respectively. Therefore, each threshold value can be set based upon the stable bottom value and the stable peak value. It further leads to an improvement of reliability for setting the threshold values. Further, this invention can be applicable for step S23 in which the n number of data in a descending order of scale of the bottom values sorted in the order of scale can be deleted and the n number of data in an ascending order of scale of the peak values sorted in the order of scale can be deleted.

The program then proceeds to step S24 for calculating the reference value based upon the stable bottom value and the stable peak value in accordance with the following formula:

Reference value=Σ[Bottom counter value(N)+Peak counter value(N)/2]/(64−2n)

The reference value is calculated by striking the average value of the bottom value and the peak value divided by the number of memorizing times calculated by subtracting 2n data from the value of 64. The program then proceeds to step S25 so as to calculate the deviation A(N) at the side of the bottom value and the deviation B(N) at the side of the peak value based upon the reference value in accordance with the following formula (i.e. the deviation calculating means):

Deviation A(N)=Reference value−Bottom counter value (N),

Deviation B(N)=Peak counter value (N)−Reference value.

The program sequentially proceeds to steps S26 and S27, wherein the bottom threshold value and the peak threshold value are respectively set based upon the reference value calculated at step S24 and the deviations A(N), B(N) in accordance with the following formulas (i.e. the threshold value setting means):

Bottom threshold value=MIN[ΣA(N)/N·x %, the minimum value from A(1) to A(N)·y %], and Peak threshold value=MIN[ΣB(N)/N·x %, the minimum value from B(1) to B(N)·y %].

As described above, the CPU compares two values so as to set the smaller value thereof as the bottom threshold value. One of the two values is calculated by multiplying the average value of the deviations A(N) by the predetermined ratio x %. The other one of the two values is calculated by multiplying the minimum value from the deviation A(1) to the deviation A(N) by the predetermined ratio y %. It premises that the average value of the deviations A(N) corresponds to 100% and the reference value corresponds to 0% relative to the average value of the deviations A(N). In the same manner, the CPU compares two values so as to set the smaller value thereof as the peak threshold value. One of the two values is calculated by multiplying the average value of the deviations B(N) by the predetermined ratio x %. The other one of the two values is calculated by multiplying the minimum value from the deviation B(1) to the deviation B(N) by the predetermined ratio y %. It also premises that the average value of the deviations B(N) corresponds to 100% and the reference value corresponds to 0% relative to the average value of the deviations B(N). The predetermined ratios x % and y % are set for example at several tens percentages. Further, the value of x is always set to be smaller than the value of one hundred.

More specifically, according to the first embodiment of the present invention, the bottom threshold value and the peak threshold value are set at positions which are lower than the average value of the deviations A(N) by x % and lower than the average value of the deviations B(N) by x %, respectively. Therefore, the binary signal can be outputted based upon the bottom threshold value and the peak threshold value. However, there may be a case that the sensor signal is fluctuated at lower positions than the positions of the bottom and peak threshold values. In this case, the binary signal may not be outputted based upon the sensor signal fluctuated at the lower positions which are not included by the first conditional expressions (ΣA(N)/N·x % and ΣB(N)/N·x %). To overcome the problem, each bottom threshold value and peak threshold value is renewed by a value calculated in accordance with each second conditional expression (a minimum value from A(1) to A(N)·y % and a minimum value from B(1) to B(N)·y %). Although the binary signal can not be outputted based upon the bottom and peak threshold values set only in accordance with the first conditional expressions, the wave shape of the fluctuating sensor signal can be detected based upon the bottom and peak threshold values in accordance with the second conditional expressions. Therefore, the binary signal can be outputted.

The program then proceeds to step S13 illustrated in FIG. 2, wherein the bottom value detection flag I and the peak value detection flag J are initialized to be zero, and the counter value N for denoting the number of detecting times of the bottom value and the peak value are set at (N+1). The program then proceeds to step S14 for judging whether or not the deviation A(N) is smaller than the bottom threshold value set at step S26 or for judging whether or not the flag K has been set at the value of 1. The flag K is set at the value of 1 when the deviation A(N) exceeds the bottom threshold value. When at least either one of the conditions at step S14 is satisfied, the program then proceeds to step S16. However, when at least either one of the conditions at step S14 is not satisfied, the program proceeds to step S15 so as to set the flag K at the value of 1. The program further proceeds to step S18 from step S15. At step S16, the CPU judges whether or not the deviation B(N) is smaller than the peak threshold value set at step S27 or judges whether or not the flag K has been set at the value of 0. When at least either one of the conditions at step S16 is satisfied, the program to step S3 so as to repeatedly perform the process from step S3. When at least one of the conditions at step S16 is not satisfied, the program then proceeds to step S17 so as to set the flag K at the value of 0. The program further proceeds to step S18 from step S17. The binary signal with the high electric potential (Hi) is inverted to the binary signal with the low electric potential (Lo) at step S18. On the other hand, the binary signal with the low (Lo) is inverted to the binary signal with the high electric potential (Hi) at step S18. The program then returns to step S3 and the process from step S3 is repeatedly performed.

As described above, the bottom threshold value is set at the value calculated by multiplying the average value of the deviations A(N) by the predetermined ratio x %. In the same manner, the peak threshold values is set at the value calculated by multiplying the average value of the deviations B(N) by the predetermined ratio x %. These calculations premise that each average value of the deviations A(N) and the deviations B(N) corresponds to 100% and the reference value corresponds to 0% relative to each average value of the deviations A(N) and the deviations B(N). The binary signal can be outputted based upon the bottom threshold value and the peak threshold value.

Figure 5:
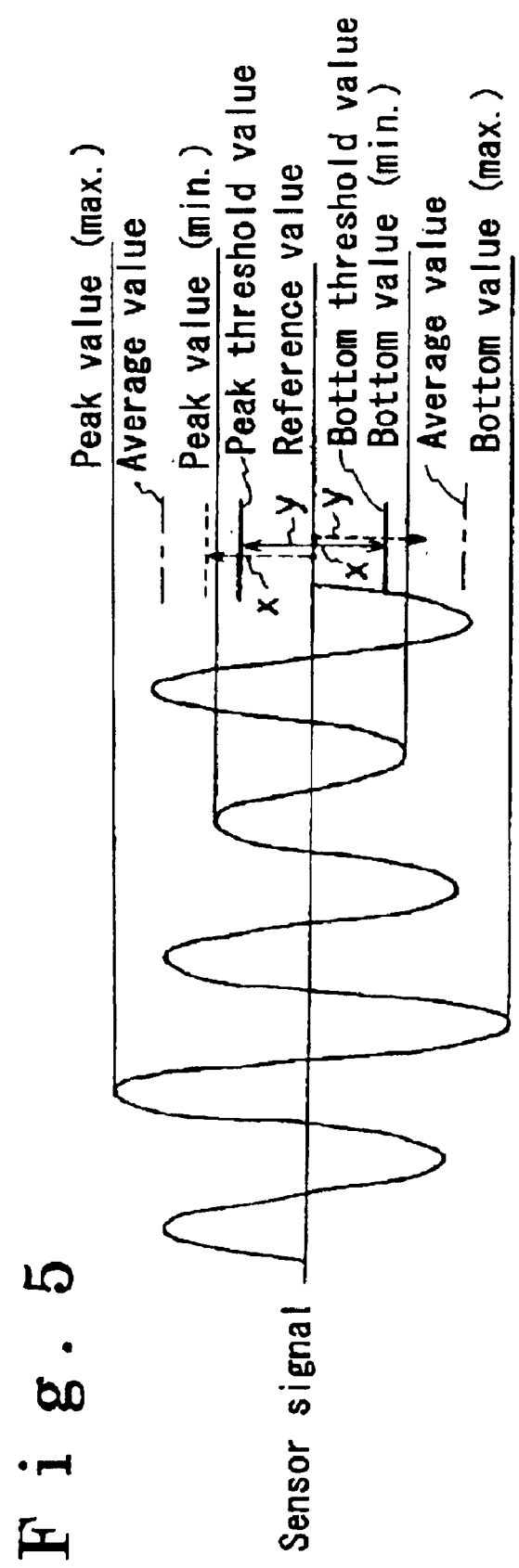
FIG. 5 illustrates in more detail the relationship between the wave shape of the sensor signal and the wave shape of the binary signal shown in FIG. 4.

However, if the sensor signal is fluctuated at lower levels than two levels, one is the level of the value calculated by multiplying the average value of the deviations A(N) by the predetermined ratio x % and the other one is the level of the value calculated by multiplying the average value of the deviations B(N) by the predetermined ratio y %, a pulse failure may occur and the accurate binary signal may not be able to be outputted. Therefore, as illustrated in FIG. 5, each bottom threshold value and peak threshold value is renewed by the value calculated in accordance with each second conditional expression (the minimum value from A(1) to A(N)·y % and the minimum value from B(1) to B(N)·y %). In this case, both of the values calculated in accordance with the second conditional expressions (the minimum value from A(1) to A(N)·y % and the minimum value from B(1) to B(N)·y %) are set not to exceed the minimum bottom value and the minimum peak value, respectively. Therefore, the signal processing apparatus 1 can output an accurate binary signal without the occurrence of the pulse failure.

Figure 8:
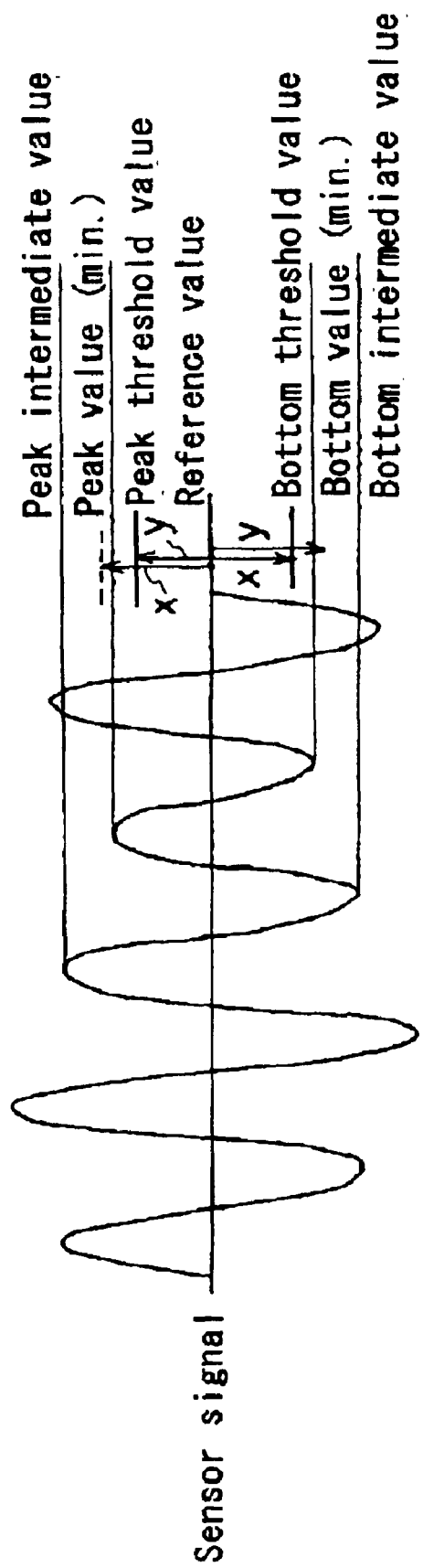
FIG. 8 illustrates a relationship between a wave shape of a sensor signal inputted into the signal processing apparatus and a wave shape of a binary signal outputted therefrom according to the second embodiment.
Figure 9:
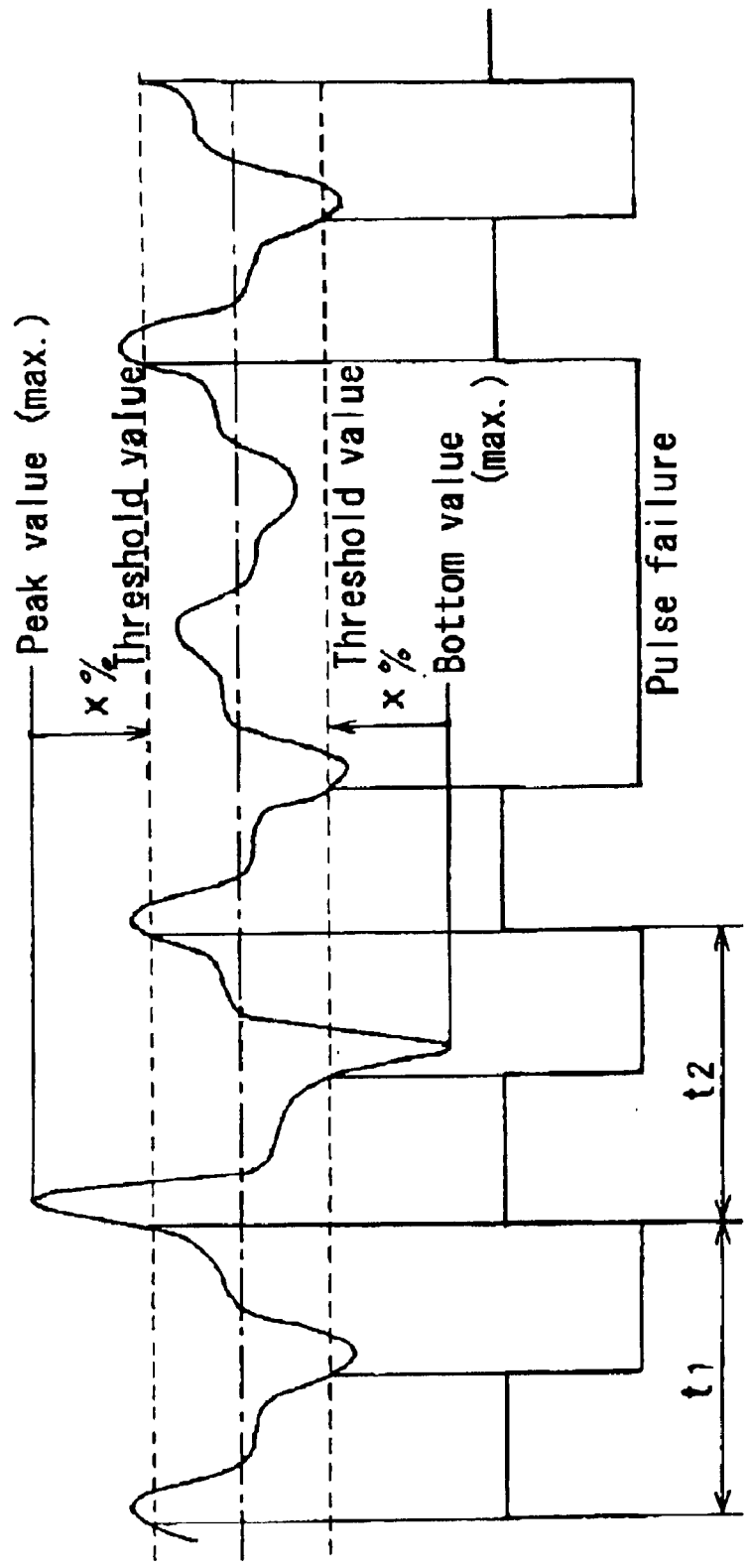
FIG. 9 illustrates a relationship between a wave shape of a sensor signal and a wave shape of a binary signal according to a conventional art.

Next, the signal processing apparatus 1 according to a second embodiment of the present invention is described below. The bottom threshold value according to the first embodiment is set by multiplying the average value of the deviations A(N) for a predetermined period of time by the predetermined ratio x %. In the same manner, the peak threshold value according to the first embodiment is set by multiplying the average value of the deviations B(N) for a predetermined period of time by the predetermined ratio y %. However, as illustrated in FIG. 8, the bottom threshold value and the peak threshold value according to the second embodiment are set based upon an intermediate value of the deviations A(N) for a predetermined period of time and an intermediate value of the deviations B(N) for a predetermined period of time, respectively.

Figure 6:
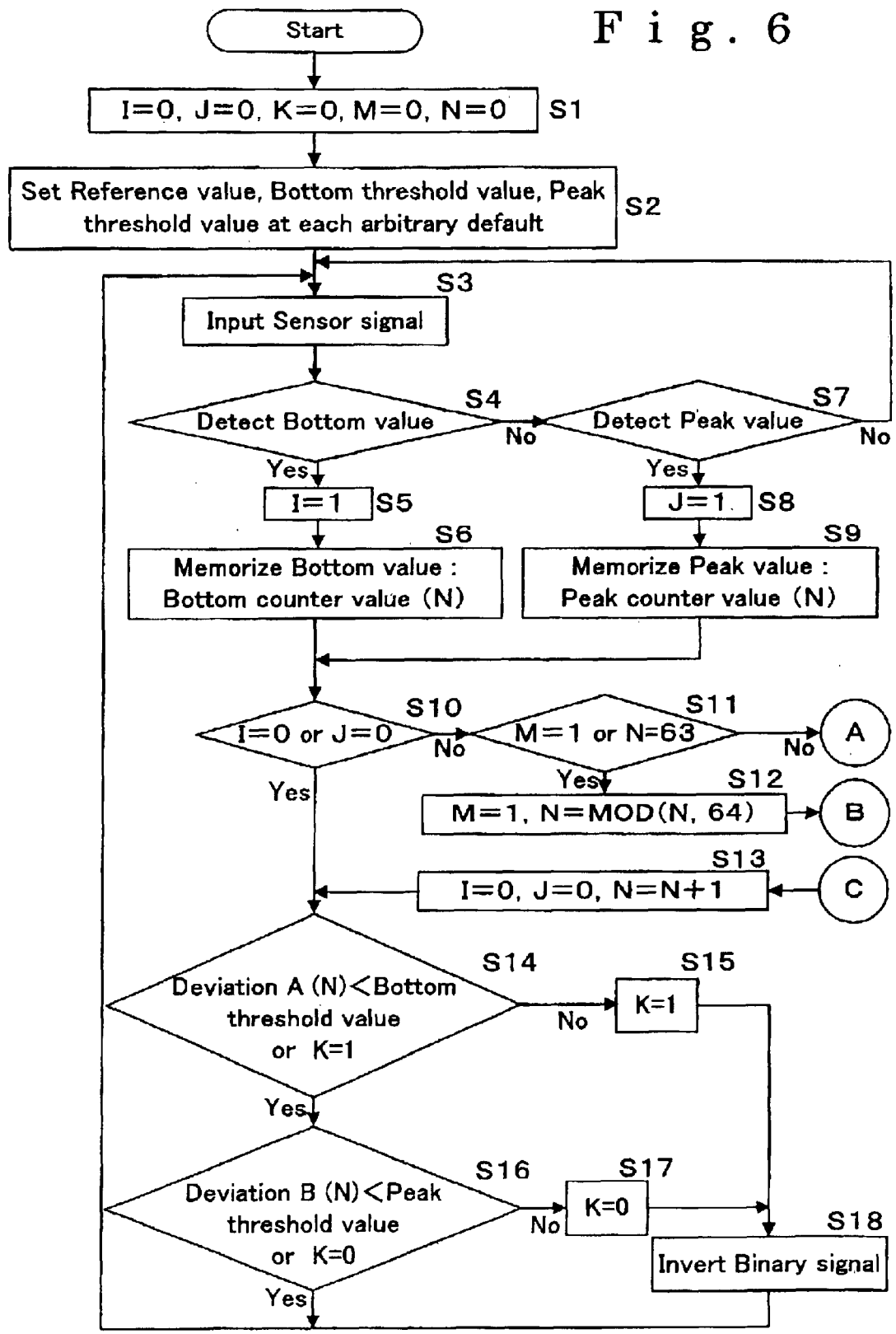
FIG. 6 is a flow chart illustrating a process performed by the signal processing apparatus shown in FIG. 1 according to a second embodiment of the present invention.
Figure 7:
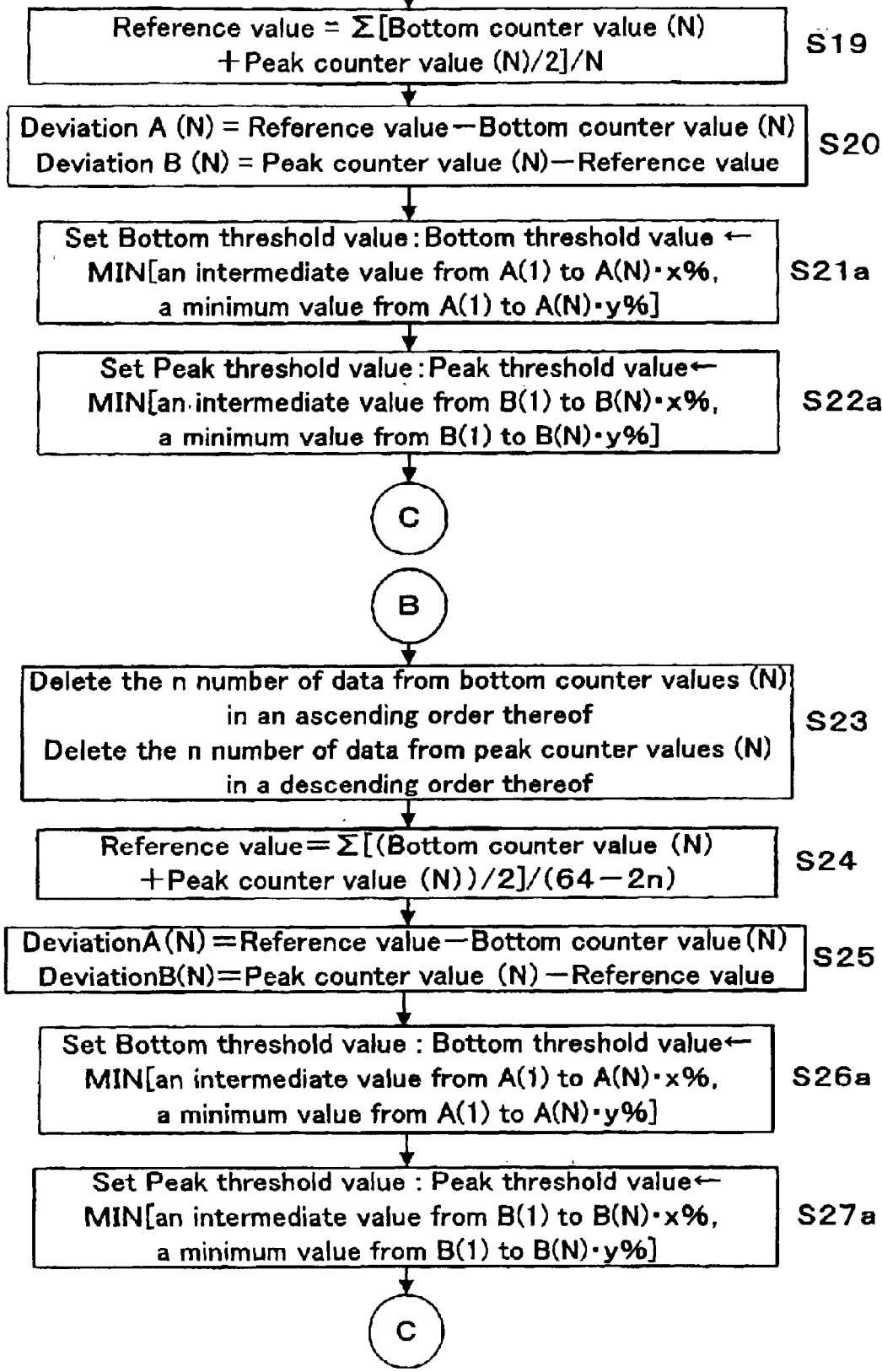
FIG. 7 is a flow chart continued from the flow chart shown in FIG. 6 according to the second embodiment.

More specifically, the deviations A(N) and the deviations B(N) are sorted in the order of scale, respectively. The bottom threshold value and the peak threshold value are set by multiplying the intermediate value of the deviations A(N) by the predetermined x % and by multiplying the intermediate value of the deviations B(N) by the predetermined x %, respectively. In this case, the same effect can be produced as the first embodiment of the present invention. The entire program according to the second embodiment is illustrated by the flow charts in FIGS. 6 and 7 and is the same as the process according to the first embodiment except for steps S21a (corresponding to step S21 according to the first embodiment), S22a (corresponding to step S22), S26a (corresponding to step S26), and S27a (corresponding to step S27). When the even number of bottom deviation A(N=2n) and the even number of peak deviation B(N−2n) are memorized, each intermediate value is set based upon any one of the central values or based upon the average value of the central values. When the odd number of the deviation A(N−2n+1) and the deviation B(N=2n+1) are memorized, each intermediate value is set based upon the central value which is set in the order of scale. Therefore, the intermediate value can be calculated very easily.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A signal processing apparatus, comprising:

a bottom value memorizing means for memorizing a bottom value of a sensor signal;

a peak value memorizing means for memorizing a peak value of a sensor signal;

a reference value calculating means for calculating a reference value based upon the bottom value and the peak value;

a deviation calculating means for calculating a first deviation between the reference value and the bottom value and a second deviation between the reference value and the peak value;

a threshold value setting means for calculating a first average value of the first deviation for a predetermined period of time and a second average value of the second deviation for the predetermined period of time, and for setting a first threshold value based upon the first average value multiplied by a first ratio and a second threshold value based upon the second average value multiplied by the first ratio; and an outputting means for outputting a binary signal by comparing the sensor signal with the first threshold value and by comparing the sensor signal with the second threshold value, wherein the first threshold value is renewed by a first value calculated by multiplying a minimum value of the first deviation for the predetermined period of time by a second ratio when the minimum value of the first deviation is equal to or smaller than the first threshold value and the second threshold value is renewed by a second value calculated by multiplying a minimum value of the second deviation for the predetermined period of time by the second ratio when the minimum value of the second deviation is equal to or smaller than the second threshold value, and the outputting means outputs the binary signal based upon the renewed first threshold value when the minimum value of the first deviation is equal to or smaller than the first threshold value and the outputting means outputs the binary signal based upon the renewed second threshold value when the minimum value of the second deviation is equal to or smaller than the second threshold value.

2. A signal processing apparatus, according to claim 1, wherein the first threshold value is compared with the first value so as to set a smaller value thereof as the first threshold value or the second threshold value is compared with the second value so as to set a smaller value thereof as the second threshold value.

3. A signal processing apparatus, according to claim 1, wherein the first threshold value is set based upon the bottom value from which a predetermined number of value in an ascending order of scale is deleted or the second threshold value is set based upon the peak value from which a predetermined number of value in a descending order of scale is deleted.

4. A signal processing apparatus, according to claim 1, wherein the first threshold value is set based upon the bottom value from which a predetermined number of value in a descending order of scale is deleted or the second threshold value is set based upon the peak value from which a predetermined number of value in an ascending order of scale is deleted.

5. A signal processing apparatus, according to claim 1, wherein the reference value is calculated by striking an average value of the bottom value and the peak value.

6. A signal processing apparatus, comprising:

a bottom value memorizing means for memorizing a bottom value of a sensor signal;

a peak value memorizing means for memorizing a peak value of a sensor signal;

a reference value calculating means for calculating a reference value based upon the bottom value and the peak value;

a deviation calculating means for calculating a first deviation between the reference value and the bottom value and a second deviation between the reference value and the peak value;

a threshold value setting means for calculating a first intermediate value of the first deviation for a predetermined period of time and a second intermediate value of the second deviation for the predetermined period of time, and for setting a first threshold value based upon the first intermediate value multiplied by a first ratio and a second intermediate value based upon the second intermediate value multiplied by the first ratio; and an outputting means for outputting a binary signal by comparing the sensor signal with the first threshold value by comparing the sensor signal with the second threshold value, wherein the first threshold value is renewed by a first value calculated by multiplying a minimum value of the first deviation for the predetermined period of time by a second ratio when the minimum value of the first deviation is equal to or smaller than the first threshold value and the second threshold value is renewed by a second value calculated by multiplying a minimum value of the second deviation for the predetermined period of time by the second ratio when the minimum value of the second deviation is equal to or smaller than the second threshold value, and the outputting means outputs the binary signal based upon the renewed first threshold value when the minimum value of the first deviation is equal to or smaller than the first threshold value and the outputting means outputs the binary signal based upon the renewed second threshold value when the minimum value of the second deviation is equal to or smaller than the second threshold value.

7. A signal processing apparatus, according to claim 6, wherein the first threshold value is compared with the first value so as to set a smaller value thereof as the first threshold value or the second threshold value is compared with the second value so as to set a smaller value thereof as the second threshold value.

8. A signal processing apparatus, according to claim 6, wherein the first threshold value is set based upon the bottom value from which a predetermined number of value in an ascending order of scale is deleted or the second threshold value is set based upon the peak value from which a predetermined number of value in a descending order of scale is deleted.

9. A signal processing apparatus, according to claim 6, wherein the first threshold value is set based upon the bottom value from which a predetermined number of value in a descending order of scale is deleted or the second threshold value is set based upon the peak value from which a predetermined number of value in an ascending order of scale is deleted.

10. A signal processing apparatus, according to claim 6, wherein the reference value is calculated by striking an average value of the bottom value and the peak value.

* * * * *